/ United States Patent / Froeschl et al.

(10) Patent No.: US 11,909,200 B2
(45) Date of Patent: Feb. 20, 2024

(54) VEHICLE ELECTRICAL SYSTEM AND METHOD FOR PROTECTING A VEHICLE ELECTRICAL SYSTEM

(71) Applicant: Bayerische Motoren Werke Aktiengesellschaft, Munich (DE)

(72) Inventors: Joachim Froeschl, Herrsching (DE); Ottmar Sirch, Ebersberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 156 days.

(21) Appl. No.: 17/630,600

(22) PCT Filed: Jul. 17, 2020

(86) PCT No.: PCT/EP2020/070345
§ 371 (c)(1),
(2) Date: Jan. 27, 2022

(87) PCT Pub. No.: WO2021/018640
PCT Pub. Date: Feb. 4, 2021

(65) Prior Publication Data
US 2022/0255312 A1 Aug. 11, 2022

(30) Foreign Application Priority Data

Jul. 30, 2019 (DE) ..................... 10 2019 120 567.0

(51) Int. Cl.
*H02H 7/00* (2006.01)
*H02H 7/26* (2006.01)
(Continued)

(52) U.S. Cl.
CPC ............. *H02H 7/262* (2013.01); *B60R 16/03* (2013.01); *H02H 7/20* (2013.01); *H02H 9/02* (2013.01)

(58) Field of Classification Search
None
See application file for complete search history.

(56) References Cited

U.S. PATENT DOCUMENTS

| 4,814,932 A | 3/1989 | Morelli | |
| 10,923,902 B2 * | 2/2021 | Schiemann | ............ H02H 3/044 |

(Continued)

FOREIGN PATENT DOCUMENTS

| CN | 103457246 A | 12/2013 |
| CN | 106255623 A | 12/2016 |

(Continued)

OTHER PUBLICATIONS

Chinese-language Office Action issued in Chinese Application No. 202080054699.3 dated Jun. 12, 2023 with English translation (22 pages).

(Continued)

*Primary Examiner* — Stephen W Jackson
(74) *Attorney, Agent, or Firm* — Crowell & Moring LLP

(57) ABSTRACT

An electrical system for a motor vehicle includes a current distributor; a plurality of first lines which are designed to connect a corresponding plurality of electric components to the current distributor; a plurality of semiconductor-based first switch elements, wherein a specified first switch element of a specified first line is designed to interrupt said specified first line; a second line which is designed to connect the current distributor to the electrical system; a limiting unit which is designed to limit or prevent a second current on the second line; and a control unit which is designed to determine that the specified first switch element does not open although a first current running through the specified first switch element exceeds a first current thresh- (Continued)

old and, in response to said determination, to trigger the limiting unit to limit or prevent the second current on the second line.

12 Claims, 4 Drawing Sheets

(51) Int. Cl.
*B60R 16/03* (2006.01)
*H02H 7/20* (2006.01)
*H02H 9/02* (2006.01)

(56) References Cited

U.S. PATENT DOCUMENTS

| | | | |
|---|---|---|---|
| 2010/0039741 | A1 | 2/2010 | Booth et al. |
| 2013/0253722 | A1* | 9/2013 | Nakamura ............. B60R 16/03 700/295 |
| 2015/0162747 | A1 | 6/2015 | Iwasaki |
| 2017/0036622 | A1 | 2/2017 | Horn et al. |
| 2017/0087997 | A1 | 3/2017 | Trunk et al. |
| 2017/0129339 | A1 | 5/2017 | Krammer et al. |
| 2017/0294773 | A1* | 10/2017 | Illing .................... H02H 9/025 |
| 2019/0184922 | A1 | 6/2019 | Tazarine et al. |
| 2021/0391709 | A1 | 12/2021 | Wang et al. |
| 2022/0037882 | A1* | 2/2022 | Scheier .................. H02H 1/06 |

FOREIGN PATENT DOCUMENTS

| | | |
|---|---|---|
| CN | 106537712 A | 3/2017 |
| CN | 107069669 A | 8/2017 |
| CN | 109256951 A | 1/2019 |
| CN | 109689436 A | 4/2019 |
| CN | 110048373 A | 7/2019 |
| DE | 10 2006 052 318 A1 | 5/2008 |
| DE | 10 2008 010 979 A1 | 8/2009 |
| DE | 10 2011 078 551 A1 | 1/2013 |
| DE | 10 2013 203 731 A1 | 9/2014 |
| DE | 10 2014 225 331 A1 | 6/2015 |
| DE | 10 2016 112 764 A1 | 1/2018 |
| EP | 1 564 077 A1 | 8/2005 |
| JP | 2001-119960 A | 4/2001 |
| WO | WO 2018/036670 A1 | 3/2018 |

OTHER PUBLICATIONS

International Search Report (PCT/ISA/210) issued in PCT Application No. PCT/EP2020/070345 dated Oct. 29, 2020 with English translation (six (6) pages).

German-language Written Opinion (PCT/ISA/237) issued in PCT Application No. PCT/EP2020/070345 dated Oct. 29, 2020 (six (6) pages).

German-language Search Report issued in German Application No. 10 2019 120 567.0 dated May 14, 2020 with partial English translation (12 pages).

* cited by examiner

VEHICLE ELECTRICAL SYSTEM AND METHOD FOR PROTECTING A VEHICLE ELECTRICAL SYSTEM

BACKGROUND AND SUMMARY OF THE INVENTION

The invention relates to an on-board electrical system for a vehicle. In particular, the invention relates to a method and/or to a corresponding control unit for safeguarding or for protecting an on-board electrical system of a motor vehicle.

A vehicle comprises a plurality of electrical consumers which are supplied with power via an on-board electrical system of the vehicle. A fault in an electrical consumer may lead to a short circuit on the electrical line to the electrical consumer, wherein the rest of the on-board electrical system could also be adversely affected by the short circuit. In order to protect the on-board electrical system, fuses, which are designed to disconnect the electrical consumer from the rest of the on-board electrical system as a result of a short circuit, are typically arranged on the individual lines to the individual electrical consumers, in particular in one or more current distributors.

Fuses typically have a relatively high tolerance and a relatively high reaction time. Furthermore, fuses that have been tripped have to be exchanged manually. Therefore, instead of fuses, semiconductor-based switching elements (for example MOSFETs) may be used in order to disconnect the individual electrical consumers from the on-board electrical system of a vehicle.

However, semiconductor-based switching elements may have malfunctions which may lead, for example, to a switching element being permanently closed or "ON" and no longer being able to be opened. In such a case, the faulty switching element cannot provide a protective function for the on-board electrical system.

The present document deals with the technical problem of efficiently increasing the safety of an on-board electrical system as a result of an event on an electrical supply line of the on-board electrical system.

The object is achieved by the claimed invention.

In accordance with one aspect, an on-board electrical system for a motor vehicle is described. The on-board electrical system comprises at least one current distributor, which is set up to supply a subregion of the on-board electrical system with current. An on-board electrical system typically comprises a plurality of different current distributors for different sub systems or subregions of the on-board electrical system.

The on-board electrical system furthermore comprises a plurality of first lines, which are set up to connect a corresponding plurality of electrical components to the current distributor. In other words, the subregion of the on-board electrical system that is supplied with current via the current distributor may comprise a plurality of electrical components (in particular consumers) which are each connected to the current distributor via an electrical line.

Furthermore, the on-board electrical system comprises a plurality of semiconductor-based first switching elements for the corresponding plurality of electrical components or for the corresponding plurality of first lines. In this case, a specified first switching element on a specified first line may be designed to interrupt the specified first line. In particular, (where applicable precisely) one first switching element may be provided for each first line in order to disconnect the respective first line where required (for example in the event of a short circuit). In this case, the specified first switching element for a specified first line may be designed to open automatically in a fault-free operation as soon as the first current through the specified first switching element exceeds a first current threshold value. A first switching element may comprise one or more unipolar and/or bipolar transistors, for example a metal-oxide semiconductor (MOS) transistor and/or an insulated-gate bipolar transistor (IGBT).

The on-board electrical system also comprises a second line, which is designed to connect the current distributor to the on-board electrical system. The current distributor may be designed in such a way that a second current on the second line comprises the sum of the plurality of first currents on the corresponding plurality of first lines or corresponds to the sum of the plurality of first currents. In particular, the current distributor may be designed to distribute the second current over the plurality of first lines. The second current on the second line may correspond to the current for the subregion of the on-board electrical system formed by way of the current distributor.

Furthermore, the on-board electrical system comprises a limiting unit, which is set up to limit or to prevent the second current on the second line and/or to change the second voltage on the second line. The limiting unit may comprise a second switching element (for example a MOS transistor or an IGBT), which is set up to interrupt the second line in order to prevent the second current. As an alternative or in addition, the limiting unit may comprise a converter, in particular a DC-DC voltage converter, which is set up to reduce and/or to prevent the second current. The converter may be used, for example, as an energy source for the on-board electrical system.

The on-board electrical system furthermore comprises a control unit, which is set up to determine that the specified first switching element does not open even though the first current through the specified first switching element exceeds the first current threshold value. A malfunction of the specified first switching element may thus be detected. For this purpose, for example, a current measurement unit on the specified first line may be used in order to ascertain the first current through the specified first switching element. The control unit may then detect, on the basis of the sensor data of the current measurement unit, that the specified first switching element does not open even though the first current threshold value has been exceeded.

The control unit is further set up, in response to the fact that it has been determined that the specified first switching element does not open, to prompt the limiting unit to limit or to prevent the second current on the second line and/or to reduce the second voltage on the second line. It is thus possible to bring about a limitation or an interruption of the current at a higher level of the on-board electrical system in order to limit the first current on the specified first line (having the faulty first switching element). Effects of a fault in the subregion of the on-board electrical system formed by way of the current distributor on the rest of the on-board electrical system can thus be limited efficiently and reliably.

The limiting unit may have a superordinate current threshold value from which the second current on the second line is automatically limited or prevented. The superordinate current threshold value may be greater than the first current threshold value (in particular greater than the first current threshold value by a factor of 2 or more, or 5 or more, or 10 or more).

The control unit may be set up to prompt the limiting unit to limit or to prevent the second current on the second line even if the second current has not yet reached the superordinate current threshold value. It is thus possible to bring about particularly reliable protection of the on-board electrical system.

The control unit may be set up to prompt information in relation to the specified first line on which the specified first switching element is arranged; and/or information in relation to a specified component which is connected to the current distributor via the specified first line; and/or information in relation to a fault cause for the first current on the specified first line being stored in a fault memory for the on-board electrical system before the second current on the second line is limited or prevented. It may thus reliably be made possible for the fault on the specified first line to be eliminated at a later time efficiently and in a targeted manner.

The control unit may be set up to prompt at least one component of the plurality of components (of the subregion of the on-board electrical system formed by way of the current distributor) being transferred to a safe state; and/or at least one component of the plurality of components being coupled to an alternative power supply before the second current on the second line is limited or prevented. It is thus possible to further increase the reliability of the operation of the on-board electrical system.

The control unit may be set up to predict on the basis of a (possibly machine-learned) prediction model that the specified first switching element will not open at a future time even though the first current through the specified first switching element will exceed the first current threshold value. Furthermore, the control unit may be set up, even prior to the future time, to prompt one or more measures in order to reduce an effect of the limitation or interruption of the second current on the on-board electrical system that is brought about at the future time. By predicting the time of the fault behavior of the specified first switching element, the aforementioned protective measures can be executed reliably and even at an early stage. It is thus possible to further increase the reliability of the operation of the on-board electrical system.

The control unit may be set up to prompt the limiting unit to limit the second current on the second line in such a way that at least one of the plurality of electrical components can continue to be operated in a downgraded operating mode. By limiting the second current, it is thus possible to increase the availability of the on-board electrical system efficiently.

The control unit may possibly be part of the specified first switching element (and not part of a superordinate control device). In particular, the control unit may be set up to send a control signal to a control module of the limiting unit in order to prompt the control module of the limiting unit to operate the limiting unit in such a way that the second current on the second line is limited or prevented. Decentralized control of the first switching elements and the limiting element may thus take place. It is thus possible to further increase the efficiency of the on-board electrical system.

In accordance with a further aspect, a (road) motor vehicle (in particular a passenger vehicle or a commercial vehicle or a bus or a motorbike) is described, which comprises the on-board electrical system described in this document.

In accordance with a further aspect, a method for protecting the on-board electrical system described in this document is described. The method comprises determining that a specified first switching element of a first line leading away from a current distributor does not open even though the first current through the specified first switching element exceeds a first current threshold value. The method furthermore comprises, in response thereto, prompting the second current on a second line that leads to the current distributor being limited or prevented and/or the second voltage on the second line being reduced.

In accordance with a further aspect, a software (SW) program is described. The SW program may be set up to be executed on a processor (for example on a control device of a vehicle) and in order thereby to execute the method described in this document.

In accordance with a further aspect, a storage medium is described. The storage medium may comprise an SW program, which is set up to be executed on a processor and in order thereby to execute the method described in this document.

It is to be noted that the methods, devices and systems described in this document may be used both individually and in combination with other methods, devices and systems described in this document. Furthermore, any aspects of the methods, devices and systems described in this document may be combined with one another in a wide variety of ways. In particular, the features of the claims may be combined with one another in a wide variety of ways.

The invention will be described in more detail below on the basis of exemplary embodiments.

DETAILED DESCRIPTION OF THE DRAWINGS

Figure 1A:
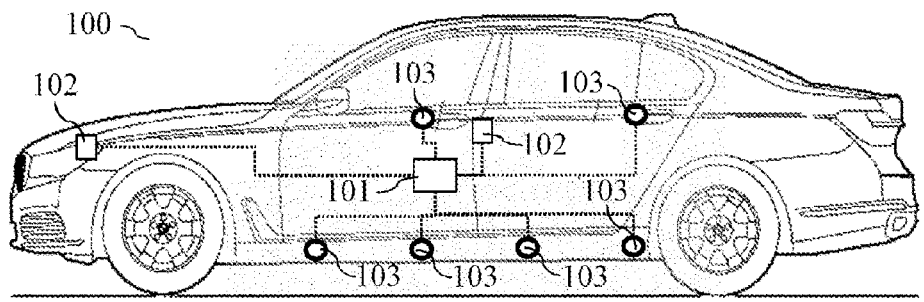
FIG. 1a shows an exemplary vehicle having exemplary electrical consumers.

As discussed in the introduction, the present document is concerned with increasing the safety of an on-board electrical system of a vehicle. In this connection, FIG. 1a shows an exemplary vehicle 100 having different electrical consumers 101, 102, 103. Exemplary electrical consumers are sensors 102, actuators 103 and/or control devices 101.

Figure 1B:
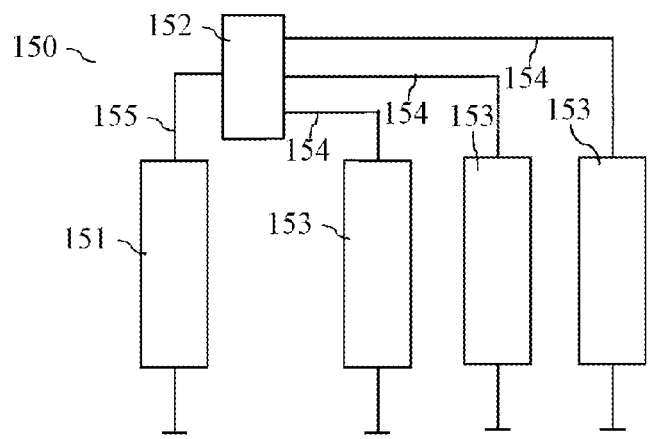
FIG. 1b shows a section of an exemplary on-board electrical system of a vehicle.

FIG. 1b shows a section of an exemplary on-board electrical system 150 of a vehicle 100. The on-board electrical system 150 comprises at least one energy source 151, which is set up to provide electrical energy in the on-board electrical system 150. Exemplary energy sources 151 are: an (electrochemical) energy store, a voltage converter and/or a generator.

The on-board electrical system 150 may have one or more current distributors 152, which are set up to supply the individual electrical consumers 153, 101, 102, 103 with current from the energy source 151 via individual first supply lines 154. The energy source 151 may be connected to the current distributor 152 via a second line 155.

Figure 1C:
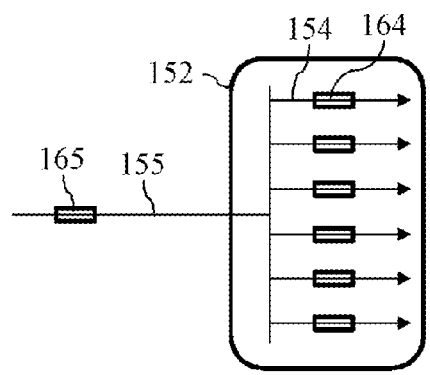
FIG. 1c shows an exemplary current distributor having fuses.

As illustrated in FIG. 1c, a current distributor 152 may comprise fuses 164, 165 on the individual lines 154, 155 in order to be able to interrupt the individual lines 154, 155 in the event of a short circuit on the individual lines 154, 155.

Figure 2A:
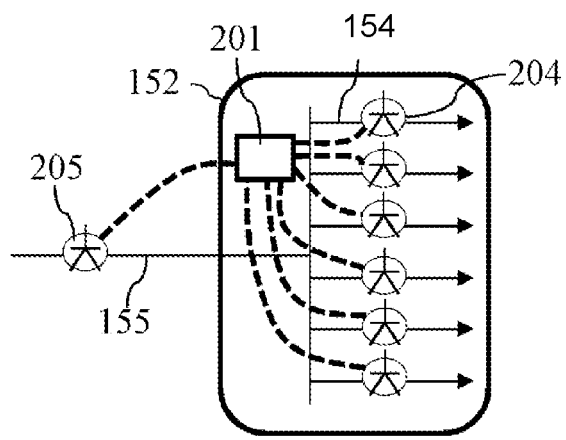
FIG. 2a shows an exemplary current distributor having semiconductor-based switching elements.

Fuses 164, 165 typically have a relatively high tolerance, react relatively slowly and are irreversible (with the result that they must be exchanged manually). As illustrated in FIG. 2a, the fuses 164, 165 may be replaced by semiconductor switches 205, 204 with a safety function. It is thus possible to improve precision, speed and reversibility. Furthermore, the use of semiconductor-based switching elements 204, 205 makes it possible to provide protective and diagnostic capabilities.

A semiconductor-based switching element 204, 205 may possibly fail and/or have a fault. For example, an intrinsic defect density may lead to an increased leakage current, as a result of which the blocking properties of the switching element 204, 205 may be adversely affected and/or as a result of which it may possibly no longer be possible to completely switch on the switching element 204, 205 at load. Overloading of a switching element 204, 205 may lead to a permanent interruption or to a permanent short circuit of the switching element 204, 205.

If a semiconductor switch 204 with a protection function fails with a permanent short circuit in the "permanent on" state, the path 154 of the semiconductor switch 204 can no longer be disconnected. A safety function of the semiconductor switch 204 can thus no longer be ensured.

As illustrated in FIG. 2a, a hierarchical arrangement of switching elements 204, 205 at different hierarchy levels may exist. The next higher hierarchy level in the current distribution system, however, typically has a significantly higher safety threshold value than a switching element 204 on the hierarchy level below. Therefore, it may be that, in the event of a short circuit on a subordinate (first) line 154, the safety function of the higher level is not tripped. The current distributor 152 is then not disconnected from the on-board electrical system 150.

As an alternative or in addition, the individual semiconductor switches 204, 205 (for example a "+ switch" and a "− switch") may be doubled in order to provide redundancy. However, this leads to doubling of the outlay and/or the costs as well as to a reduction in the availability.

As illustrated in FIG. 2a, the individual switching elements 204, 205 may be connected to one another via a communication network. In particular, the communication network may make it possible for a control unit 201 of a first switching element 204 of a first level to communicate with a second switching element 205 of a second level thereabove. In particular, the communication network may make it possible for the control unit 201 of the first switching element 204 to control the second switching element 205, for example in order to open the second switching element 205.

Figure 2B:
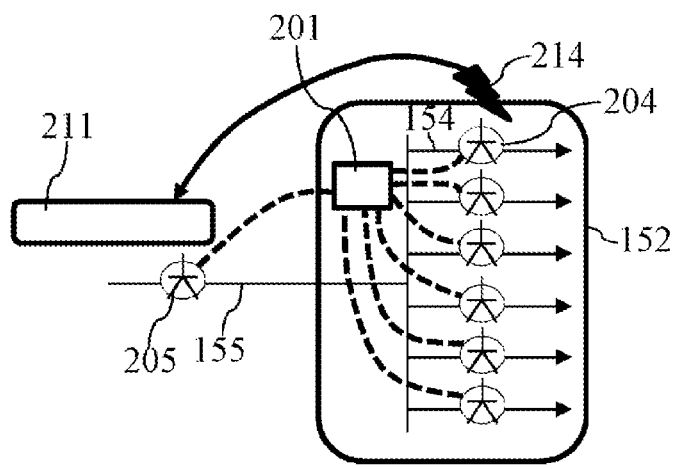
FIGS. 2b and 2c show exemplary reactions of a current distributor to an event on a first supply line.

As illustrated in FIG. 2b, an event 214 may be detected, for example, at the first switching element 204, the event 214 adversely affecting the switching of the first switching element 204. In particular, it is possible to detect that the first switching element 204 does not open and therefore the first line 154 cannot be disconnected even though a specified first current threshold value is exceeded. The control unit 201 of the first switching element 204 may subsequently send a control signal 211 to the second switching element 204 (in particular a control module of the second switching element 204) in order to open the second switching element 204. The second switching element 204 may in this case be opened where appropriate even though the second current threshold value for the permissible current through the second switching element 205 has not yet been reached. It is thus possible to reliably protect the on-board electrical system 150 by disconnecting the current distributor 152.

Figure 2C:
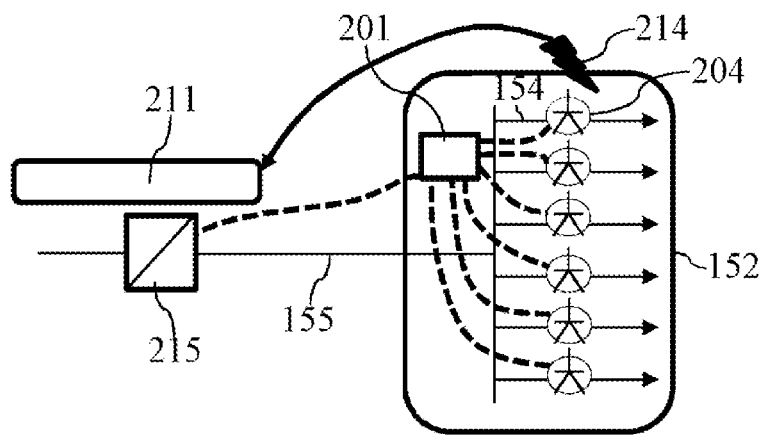

The second switching element 205 may be part of a converter 215, in particular a DC/DC or DC-DC voltage converter. As illustrated in FIG. 2c, the control unit 201 of the first switching element 204 may be set up, in response to an identified event 214, to prompt the converter 215 to reduce the current on the second line 155. The effects of the event 214 on the rest of the on-board electrical system 150 can thus be limited. The converter 215 and the second switching element 205 are examples of a limiting unit for limiting and/or for interrupting the second current through the second line 155.

The protection function 201 with the failed end stage or with the failed semiconductor switch 204 can thus be linked informally with a superordinate safety function in order to indicate a safety situation or an event 214. In response thereto, the superordinate safety function can be tripped even if the current threshold value of the superordinate safety function has not been exceeded.

FIG. 2b illustrates the failure of a semiconductor switch unit 204 of the current distributor 152 and the transmission of the detected event 214 to the semiconductor switch unit 205 of the current distributor 152 with the command 211 to interrupt or to deactivate the power supply. FIG. 2c illustrates the failure of a semiconductor switch unit 204 of the current distributor 152 and the transmission of the detected event 214 to the DC/DC converter 215 for the current distributor 152 with the command 211 to downgrade or to deactivate the power supply.

As an alternative or in addition to a higher safety level, a DC-DC voltage converter may possibly be used as an energy source 151. The energy source 151 may be prompted, for example by a control instruction 211, to decrease the output voltage or to completely disconnect the output. The voltage may be reduced, for example, in such a way that a remaining function of individual consumers 153 continues to be made possible (for example for a specified period) and that the effects of the short-circuit case are reduced, in particular minimized.

The individual safety functions may be implemented in a manner based on models, for example in order to predict a fault case or an event 214. This results in the possibility of increasing or maximizing the available delay time for tripping. This is advantageous, in particular, when the rest of the consumers, generators, etc. 153 in the supply section that is to be disconnected have to be informed or deactivated.

The control unit 201 may be set up to document diagnosis and fault storing such that the fault cause for the event 214 can be contained. It is thus possible to efficiently exchange individual faulty components. In particular, it is thus possible to prevent the erroneous exchange of a deactivated, functional component.

The hierarchical protection described in this document can be applied to: a subsystem of the on-board electrical system 150; to a segment of a supply rail; and/or to a segment of an on-board electrical system ring structure. The disconnection may be effected, for example, based on a functionally substantiated disconnection of an electrical sub-path 154 or of a component 153.

Figure 3:
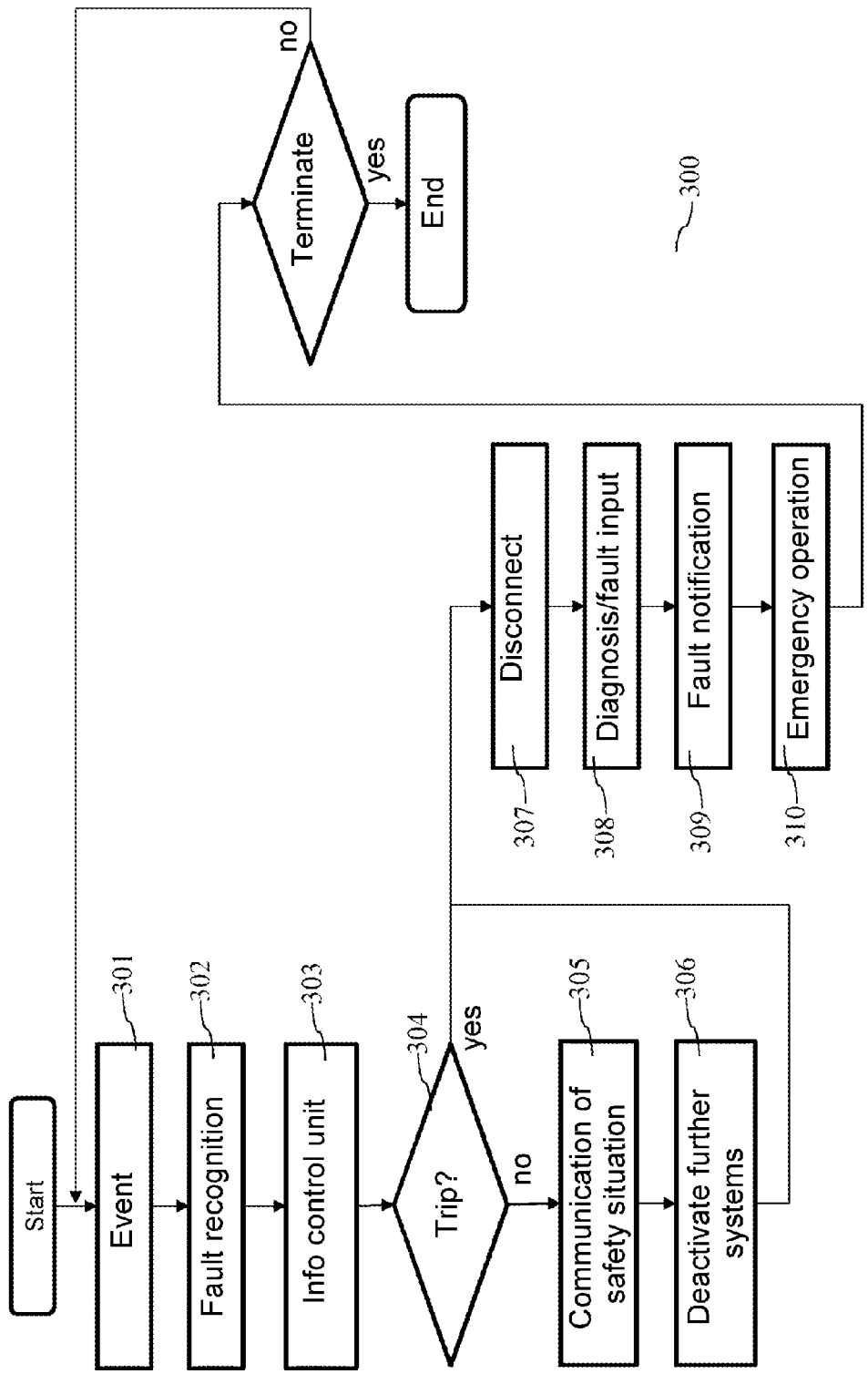
FIG. 3 shows a flowchart of an exemplary method for safeguarding an on-board electrical system of a vehicle.

FIG. 3 shows a flowchart of an exemplary method 300 for safeguarding an on-board electrical system 150. An event 214 may be detected (step 301) and a fault may be recognized based thereon (step 302). In response thereto, a higher safety level may be informed (step 303) about the identified fault and it is possible to check whether an immediate tripping is necessary (step 304).

If immediate tripping is not necessary, the safety situation within the affected subregion of the on-board electrical system 150 may be communicated, for example in order that a consumer with double energy supply can be switched over (step 305) and/or in order that a consumer is informed about the upcoming interruption of the power supply. Furthermore, if necessary, a controlled deactivation and/or downgrading of one of more systems may take place (step 306).

If immediate tripping is necessary or after the aforementioned steps 305, 306 have been carried out, the affected subregion of the on-board electrical system 150 can be disconnected (step 307). Furthermore, a diagnosis and/or the input of faults into a fault memory may be carried out (step 308). Furthermore, a fault may be notified to a user of the vehicle 100 (step 309). An emergency operation of the vehicle 100 (without the affected and/or disconnected subregion of the on-board electrical system 150) may also be brought about (step 310).

Figure 4:
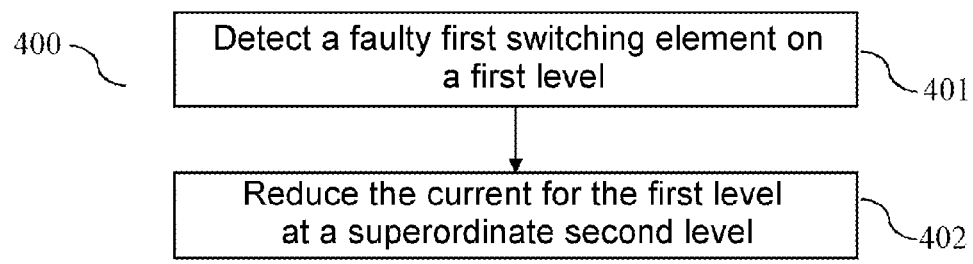
FIG. 4 shows a flowchart of a further exemplary method for safeguarding an on-board electrical system of a vehicle.

FIG. 4 shows a flowchart of a further method 400 for protecting an on-board electrical system 150 of a motor vehicle 100. The method 400 may be executed by way of a control unit 201.

The on-board electrical system 150 comprises a current distributor 152 and a plurality of first lines 154, which are set up to connect a corresponding plurality of electrical components 153 (in particular consumers 101, 102, 103) to the current distributor 152. Furthermore, the on-board electrical system 150 comprises a plurality of semiconductor-based first switching elements 204 for the corresponding plurality of electrical components 153 or for the corresponding plurality of first lines 154. In this case, a first switching element 204 on a first line 154 may be designed to interrupt the respective first line 154 (and thus to disconnect the respective component 153 from the current distributor 152). By way of a switching element 204, the individual components 153 may therefore each be disconnected from the current distributor 152 (by opening the switching element 204) or connected thereto (by closing the switching element 204).

The on-board electrical system 150 also comprises a second line 155, which is designed to connect the current distributor 152 to the on-board electrical system 150. The current distributor 152 may be designed to distribute the second current on the second line 155 over the plurality of first lines 154.

The on-board electrical system 150 furthermore comprises a limiting unit 205, 215, 151 (for example a second switching element 205 and/or a converter 215, 151), which is set up to limit or to prevent the second current on the second line 155 and/or to change a second voltage on the second line 155.

The method 400 comprises determining 401 that a specified first switching element 204 does not open even though the first current through the specified first switching element 204 exceeds a first current threshold value (at which the specified first switching element 204 should open). Furthermore, the method 400 comprises, in response thereto, prompting 402 the limiting unit 205, 215, 151 to limit or to prevent the second current on the second line 155 and/or to reduce the second voltage on the second line 155. It is thus possible to provide reliable protection for the rest of the on-board electrical system 150 even in the case of a faulty first switching element 204.

The measures described in this document make it possible to intercept a safety-critical event 311 in a subregion of an on-board electrical system 150 without additional circuitry (where possible purely on the basis of software). It is thus possible to reduce the costs, the weight and the required installation space of a vehicle 100. Furthermore, the availability of an on-board electrical system 150 may be increased. Diagnostics, fault localization and where necessary an emergency operation may also be assigned to individual components 153 of the on-board electrical system 150 in a reliable and efficient manner. In particular, fault notifications and a necessary component exchange may be clearly assigned to an affected component 153.

The present invention is not restricted to the exemplary embodiments shown. In particular, it should be noted that the description and the figures are intended to illustrate only the principle of the proposed method, devices and systems.

What is claimed is:

1. An on-board electrical system for a motor vehicle, the on-board electrical system comprising:
    a current distributor;
    a plurality of first lines, which are configured to connect a corresponding plurality of electrical components to the current distributor;
    a plurality of semiconductor-based first switching elements for the corresponding plurality of first lines, wherein a specified first switching element of a specified first line is configured to interrupt the specified first line;
    a second line, which is configured to connect the current distributor to the on-board electrical system;
    a limiting unit, which is configured to limit or to prevent a second current on the second line and/or to change a second voltage on the second line; and
    a control unit, which is configured:
        to determine that the specified first switching element does not open even though a first current through the specified first switching element exceeds a first current threshold value; and
        in response to the determination, to prompt the limiting unit to limit or to prevent the second current on the second line and/or to reduce the second voltage on the second line, wherein:
    the limiting unit has a superordinate current threshold value from which the second current on the second line is automatically limited or prevented; and
    the control unit is further configured to prompt the limiting unit to limit or to prevent the second current on the second line even if the second current has not yet reached the superordinate current threshold value.

2. The on-board electrical system according to claim 1, wherein the control unit is further configured to prompt information in relation to:
    the specified first line on which the specified first switching element is arranged;
    a specified component which is connected to the current distributor via the specified first line; and/or
    a fault cause for the first current on the specified first line being stored in a fault memory for the on-board electrical system before the second current on the second line is limited or prevented.

3. The on-board electrical system according to claim 1, wherein the control unit is further configured to prompt:
    at least one component of the plurality of components being transferred to a safe state; and/or
    at least one component of the plurality of components being coupled to an alternative power supply before the second current on the second line is limited or prevented.

4. The on-board electrical system according to claim 1, wherein:
    the limiting unit comprises a second switching element, which is configured to interrupt the second line in order to prevent the second current; and/or the limiting unit comprises a converter, which is configured to reduce and/or to prevent the second current.

5. The on-board electrical system according to claim 4, wherein:
the converter is a DC-DC voltage converter.

6. The on-board electrical system according to claim 1, wherein the control unit is further configured to prompt the limiting unit to limit the second current on the second line such that at least one of the plurality of electrical components can continue to be operated in a downgraded operating mode.

7. The on-board electrical system according to claim 1, wherein:
the control unit is part of the specified first switching element; and/or
the control unit is further configured to send a control signal to a control module of the limiting unit in order to prompt the control module of the limiting unit to operate the limiting unit such that the second current on the second line is limited or prevented.

8. The on-board electrical system according to claim 1, wherein at least one of the first switching elements comprises a metal-oxide semiconductor (MOS), a transistor, and/or an insulated-gate bipolar transistor (IGBT).

9. The on-board electrical system according to claim 1, wherein the control unit is further configured:
to predict, based on a prediction model, that the specified first switching element will not open at a future time even though the first current through the specified first switching element will exceed the first current threshold value; and,
prior to the future time, to prompt one or more measures in order to reduce an effect of the limitation or interruption of the second current on the on-board electrical system that is brought about at the future time.

10. The on-board electrical system according to claim 1, wherein:
the current distributor is configured such that the second current on the second line comprises a sum of a plurality of first currents on the corresponding plurality of first lines or corresponds to the sum; and/or
the current distributor is configured to distribute the second current over the plurality of first lines.

11. The on-board electrical system according to claim 1, wherein:
the specified first switching element is configured to open automatically in a fault-free operation as soon as the first current through the specified first switching element exceeds the first current threshold value; and/or
the first current threshold value is lower than a superordinate current threshold value from which the limiting unit automatically limits or prevents the second current on the second line.

12. A method for protecting an on-board electrical system of a motor vehicle, wherein the on-board electrical system comprises a current distributor and a plurality of first lines, which are configured to connect a corresponding plurality of first lines to the current distributor, wherein the on-board electrical system comprises a plurality of semiconductor-based first switching elements for the corresponding plurality of electrical components, wherein a specified first switching element of a specified first line is configured to interrupt the specified first line, and wherein the on-board electrical system comprises a second line, which is configured to connect the current distributor to the on-board electrical system, and a limiting unit, which is configured to limit or to prevent a second current on the second line and/or to change a second voltage on the second line, the method comprising:
determining that the specified first switching element does not open even though a first current through the specified first switching element exceeds a first current threshold value; and,
in response to the determining, prompting the limiting unit to limit or to prevent the second current on the second line and/or to reduce the second voltage on the second line, wherein:
the limiting unit has a superordinate current threshold value from which the second current on the second line is automatically limited or prevented; and
the method further comprises prompting the limiting unit to limit or to prevent the second current on the second line even if the second current has not yet reached the superordinate current threshold value.

* * * * *